UNITED STATES PATENT OFFICE.

ALEXANDER SCHANSCHIEFF, OF LONDON, ENGLAND.

SECONDARY BATTERY.

SPECIFICATION forming part of Letters Patent No. 619,622, dated February 14, 1899.

Application filed September 20, 1895. Serial No. 563,134. (No specimens.)

*To all whom it may concern:*

Be it known that I, ALEXANDER SCHANSCHIEFF, a subject of the Queen of Great Britain and Ireland, residing at London, England, have invented certain new and useful Improvements in Secondary Batteries, (for which I have obtained the following patents, viz: in Great Britain, dated June 21, 1894, No. 12,045, and April 23, 1895, No. 8,081, respectively;) and I do hereby declare the following to be a full, clear, and exact description of the invention, such as will enable others skilled in the art to which it appertains to make and use the same.

The objects of this invention are to increase the efficiency and to reduce the weight and bulk of secondary batteries.

I use a grid or electrode of any desirable shape, size, or material, such as the exigencies of the case may require—as, for instance, a grid made of lead, iron coated with lead or silver, or where very small batteries of great lightness and portability are desired the grids are made entirely of silver. On each plate is put a layer of minium (for a positive element) or of litharge (for a negative element) mixed with a paste presently to be described.

The paste which I compound with the minium (as active element for a positive element) or with litharge (as active material for the negative element) is of such a nature as to allow of thoroughly penetrative chemical action of the electrolyte. To form the paste, I mix sugar with a little water, (preferably distilled,) so as to leave some of the sugar undissolved. I then add sulfuric acid of 1.856° Baumé until the carbon is thrown up, fumes of sulfuric acid passing off, while the bulk of the material increases very largely. The carbon thus prepared is left to cool and is then mixed with the respective metallic salt. A suitable proportion is that of about one part, by volume, of the carbon to two parts of the salt. This mixture having cooled I add dilute sulfuric acid to form a paste of the consistency of putty. The paste is then ready for use. This paste hardens quickly, is not easily washed out or disintegrated, is very porous and gas-absorbing, and the conductivity of the plate is great. Instead of sugar I may use treacle.

By the action of sulfuric acid upon a saccharose gaseous product, such as carbonic oxid, carbonic acid and sulfuric acid are evolved, and other bodies—such as acetic acid, humin materials, and furfurol—are formed, while a carbon is obtained in an extremely finely divided condition. The exact composition of all the resulting compounds due to the action of sulfuric acid on a saccharine substance has not and, so far as I am aware, cannot be determined by any known method of analysis. The carbon compound resulting from this action presents a rather complicated mixture the chemical behavior of which is quite different from that of the carbon hitherto used—as pulverized coke, for instance. That the product of the reaction is not pure carbon, but a compound of pure carbon and other bodies, such as humin bodies, is readily ascertained by shaking up with a potash lye or a sal-ammoniac, whereby an intensely-brown solution is obtained and whereby the undissolved carbon also assumes a brown color. By acidifying the brown alkaline liquid with acetic acid brown-colored bodies are deposited.

I claim—

1. The process of manufacturing active material for electrodes for secondary batteries, which consists in carbonizing a carbohydrate such as a saccharose by treatment with sulfuric acid, mixing with the carbon compound thus obtained a conductive agent as a lead salt, and converting the mixture into a paste by addition of sulfuric acid in solution, substantially as set forth.

2. An active material for secondary batteries composed of a lead salt and a carbonized carbohydrate, substantially as described.

3. An active material for secondary batteries composed of a lead oxid, carbon, sulfuric acid, humin, and acetic acid, for the purpose set forth.

ALEXANDER SCHANSCHIEFF.

Witnesses:
FRED C. HARRIS,
GEO. J. B. FRANKLIN.